(12) United States Patent
Everson et al.

(10) Patent No.: US 8,614,976 B1
(45) Date of Patent: Dec. 24, 2013

(54) METHOD AND SYSTEM FOR REGISTERING A NICKNAME ASSOCIATED WITH A MOBILE NODE

(75) Inventors: John M. Everson, Leawood, KS (US);
Jason R. Delker, Olathe, KS (US);
Jarrod A. Nichols, Olathe, KS (US);
Von K. McConnell, Leawood, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 673 days.

(21) Appl. No.: 12/749,107

(22) Filed: Mar. 29, 2010

(51) Int. Cl.
*H04J 1/16* (2006.01)

(52) U.S. Cl.
USPC ........................... 370/328; 370/254; 455/41.2

(58) Field of Classification Search
USPC .............. 370/270, 338; 455/411, 435.1, 41.2; 709/245; 715/273
See application file for complete search history.

(56) References Cited

U.S. PATENT DOCUMENTS

| | | | |
|---|---|---|---|
| 6,614,774 B1 | 9/2003 | Wang | |
| 6,944,167 B1 | 9/2005 | McPherson | |
| 7,218,609 B2 * | 5/2007 | Borella et al. | 370/230 |
| 7,224,673 B1 * | 5/2007 | Leung et al. | 370/328 |
| 7,313,631 B1 | 12/2007 | Sesmun et al. | |
| 7,447,182 B2 * | 11/2008 | Chowdhury et al. | 370/338 |
| 7,510,113 B2 * | 3/2009 | Igarashi et al. | 235/379 |
| 7,545,762 B1 | 6/2009 | McConnell et al. | |
| 7,636,569 B2 * | 12/2009 | Le et al. | 455/435.1 |
| 7,668,174 B1 * | 2/2010 | Patel et al. | 370/395.3 |
| 7,707,310 B2 * | 4/2010 | Thubert et al. | 709/245 |
| 7,872,998 B2 * | 1/2011 | Ono et al. | 370/328 |
| 7,958,544 B2 | 6/2011 | Chen et al. | |
| 7,962,122 B2 * | 6/2011 | Nikander et al. | 455/411 |
| 8,059,643 B1 * | 11/2011 | Shojayi et al. | 370/389 |
| 8,068,499 B2 * | 11/2011 | Vidya et al. | 370/395.5 |
| 8,353,635 B2 * | 1/2013 | Masuzawa et al. | 396/463 |
| 2004/0052238 A1 * | 3/2004 | Borella et al. | 370/349 |
| 2004/0215707 A1 | 10/2004 | Fujita et al. | |
| 2004/0230446 A1 | 11/2004 | Park et al. | |
| 2005/0050180 A1 * | 3/2005 | Kim et al. | 709/221 |
| 2005/0054343 A1 | 3/2005 | Nykanen et al. | |

(Continued)

FOREIGN PATENT DOCUMENTS

WO 01/41401 A2 6/2001

OTHER PUBLICATIONS

U.S. Appl. No. 11/500,706, filed Aug. 8, 2006.

(Continued)

*Primary Examiner* — Hassan Kizou
*Assistant Examiner* — Emmanuel Maglo

(57) ABSTRACT

A mobile node is associated with a username assigned by the mobile node's wireless service provider and a nickname selected by the mobile node's user. The nickname is different than the username. When the mobile node logs on for packet data services, the mobile node is assigned a home address and an on-line registration is established in a DNS server. The on-line registration associates the nickname with the home address. The DNS server may then be queried to determine that the mobile node with that nickname is on-line and/or to determine how to reach the mobile node with that nickname. When the mobile node goes off-line, the on-line registration may be changed to an off-line registration that associates the nickname with an address of a messaging server. The messaging server may receive messages for the mobile node and/or provide messages indicating that the mobile node is off-line.

20 Claims, 4 Drawing Sheets

(56) References Cited

U.S. PATENT DOCUMENTS

| | | | |
|---|---|---|---|
| 2007/0105500 A1* | 5/2007 | Kim | 455/41.2 |
| 2008/0037498 A1* | 2/2008 | Narayanan et al. | 370/342 |
| 2009/0003297 A1 | 1/2009 | Xia et al. | |
| 2010/0002668 A1* | 1/2010 | Tan et al. | 370/338 |
| 2010/0017709 A1* | 1/2010 | Wakai et al. | 715/273 |
| 2010/0100928 A1 | 4/2010 | Gasparini et al. | |

OTHER PUBLICATIONS

3rd Generation Partnership Project 2, "cdma2000 Wireless IP Network Standard: Simple IP and Mobile IP Access Services," 3GPP2 X.S0011-002-C, Version 1.0.0, Aug. 2003.

Vixie, et al., "Dynamic Updates in the Domain Name System (DNS Update)," Network Working Group, Request for Comments: 2136, Apr. 1997.

Williamson, et al., "Referral Whois (RWhois) Protocol V1.5," Network Working Group, Request for Comments: 2167, Jun. 1997.

Rigney, et al., "Remote Authentication Dial in User Service (RADIUS)," Network Working Group, Request for Comments: 2865, Jun. 2000.

Perkins, "IP Mobility Support for IPv4," Network Working Group, Request for Comments: 3344, Aug. 2002.

Johnson, et al., "Mobility Support in IPv6," Network Working Group, Request for Comments: 3775, Jun. 2004.

Aboba, et al., "The Network Access Identifier," Network Working Group, Request for Comments: 4282, Dec. 2005.

U.S. Appl. No. 13/552,749, filed Jul. 19, 2012.

* cited by examiner

METHOD AND SYSTEM FOR REGISTERING A NICKNAME ASSOCIATED WITH A MOBILE NODE

BACKGROUND

A mobile node may access packet data services through a wireless service provider. When accessing packet data services, the mobile node may identify itself by a network access identifier (NAI) that has been assigned to it by the wireless service provider. For example, a mobile node may identify itself by NAI when registering for Mobile IP services. The Mobile IP services may involve IPv4 addresses, for example, as described in C. Perkins, "IP Mobility Support for IPv4," Request for Comments 3344, August 2002, which is incorporated herein by reference. Alternatively, the Mobile IP services may involve IPv6 addresses, for example, as described in D. Johnson et al., "Mobility Support in IPv6," Request for Comments 3775, June 2004, which is incorporated herein by reference.

The NAI may conform to the standards set forth in B. Aboba et al., "The Network Access Identifier," Request for Comments 4282, December 2005, which is incorporated herein by reference. Thus, the NAI may be in the form of "username@realm." The "realm" typically corresponds to a domain name associated with the wireless service provider. The "username" is typically assigned by the wireless service provider, for example, based at least in part on the subscriber's name. Thus, a subscriber named John Doe might be assigned a username of "jdoe01" by the wireless service provider.

OVERVIEW

In a first principal aspect, an exemplary embodiment provides a method in which a home agent receives a registration request for a mobile node. The mobile node is associated with a username and a nickname that is different than the username. After receiving the registration request, the home agent assigns a home address to the mobile node. The home agent also registers in a name server an association between the nickname and the home address.

In a second principal aspect, an exemplary embodiment provides a method in which a home agent receives an initial Mobile IP registration request for a mobile node. The initial Mobile IP registration request includes a care-of address for the mobile node. The home agent also receives a nickname that has been selected by a user of the mobile node. The home agent assigns a home address to the mobile node and creates a mobility binding that associates the home address with the care-of address. The home agent also establishes an on-line registration for the mobile node in a domain name system (DNS) server. The on-line registration associates the nickname with the home address.

In a third principal aspect, an exemplary embodiment provides a system comprising a DNS server, an authentication server, and a home agent. The authentication server stores user profile information regarding a mobile node, including a username selected by a wireless service provider and a nickname selected by a user of the mobile node. The nickname is different than the username. The home agent is configured to receive a registration request that includes the username, assign a home address to the mobile node, and establish an on-line registration for the mobile node in the DNS server. The on-line registration associates the nickname with the home address.

DETAILED DESCRIPTION OF EXEMPLARY EMBODIMENTS

1. Introduction

Figure 1:
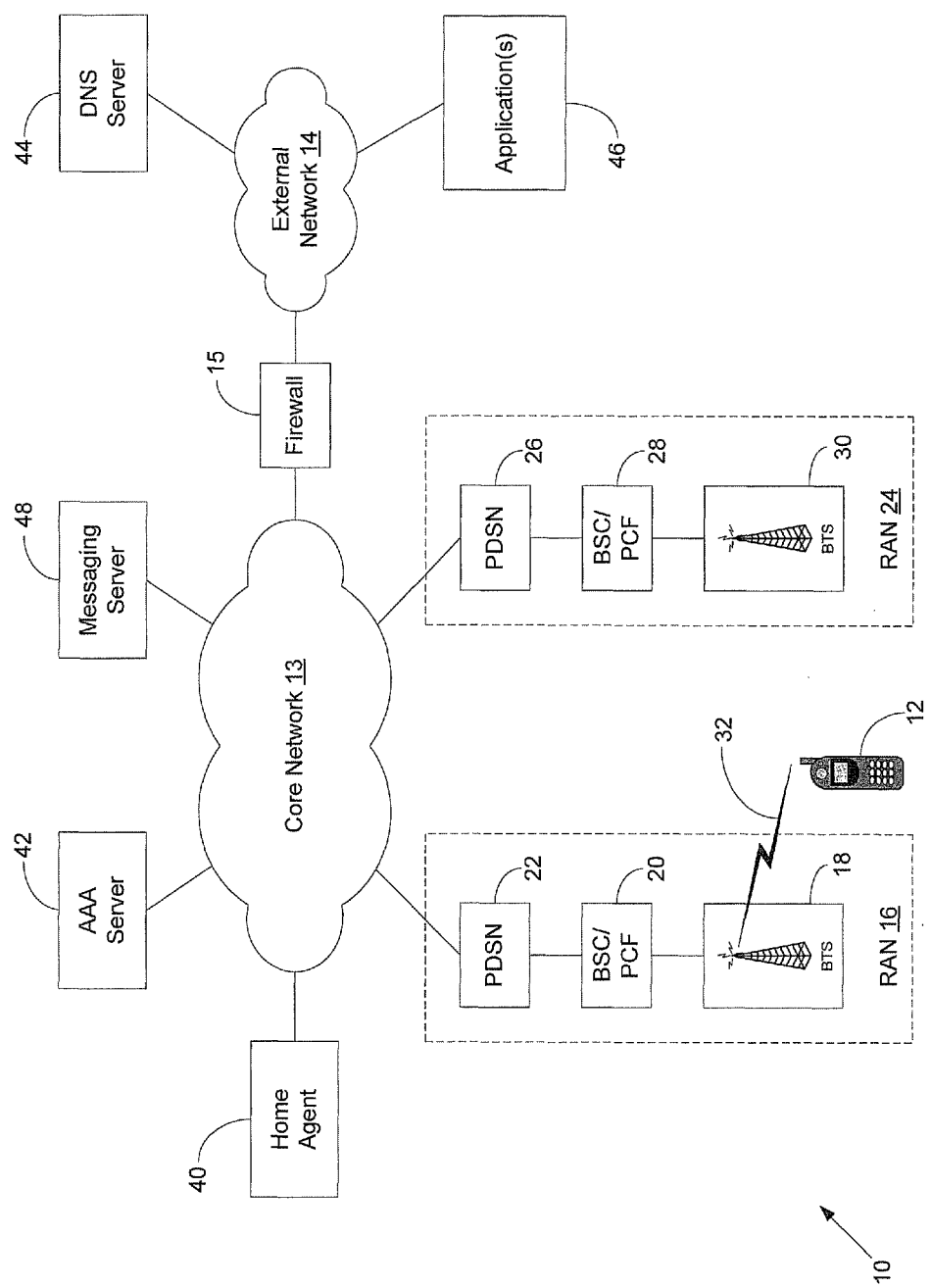
FIG. 1 is a block diagram of a wireless telecommunications network, in accordance with an exemplary embodiment.

Whereas the username in a mobile node's NAI is typically assigned by the mobile node's wireless service provider, the inventors propose methods and system that allow a mobile node to be identified by a nickname that may be selected by the mobile node's user. The nickname may be different than the username. For example, a user may want to be identified by a nickname that is more interesting or more in line with the user's personality or interests than the username assigned by the wireless service provider. Thus, a subscriber that is assigned the username "jdoe01" by the wireless service provider might want to be known on-line by a friendlier nickname, such as "sportsfan."

The wireless service provider may register a mobile node's nickname when the mobile node logs on for packet data services. For example, when the mobile node registers for Mobile IP services, a home agent may receive a registration request for the mobile node, assign a home address to the mobile node, and establish a registration in a name server that associates the nickname with the home address. In an exemplary embodiment, the name server is a domain name system (DNS) server and the registration is a resource record. An application may subsequently use the nickname to query the name server, for example, to determine that the mobile node with that nickname is currently on-line and/or to determine how to reach the mobile node with that nickname. Thus, the registration may serve as an on-line or presence registration for the mobile node.

In addition to registering the mobile node's nickname in a DNS server or other name server, the wireless service provider may change its data traffic policies so as to allow traffic from external applications to reach the mobile node. For example, the wireless service provider may use one or more firewalls or other elements that enforce policies that block at least certain categories of packets from external applications. When the mobile node's nickname is registered, however, the wireless service provider may adjust its firewall policies so as to allow external packets that identify the mobile node's home address as their destination address.

When the mobile node logs off, the wireless service provider may either remove the registration or change it to an off-line status. For example, when the home agent is notified that the mobile node is off-line, the home agent may change the mobile node's on-line registration in the name server to an off-line registration that associates the nickname with an address of a messaging server. The messaging server may be configured to receive and store messages for the mobile node when the mobile node is off-line and/or provide messages indicating that the mobile node is off-line.

The home agent may obtain the mobile node's nickname in various ways. In one approach, the user provides the nickname to the wireless service provider in advance and the wireless service provider adds the nickname to a user profile associated with the mobile node. For example, the user profile containing the nickname may be stored on an authentication server that authenticates requests involving the mobile node. Then, when the mobile node logs on and the home agent receives a registration request for the mobile node, the home agent may obtain the mobile node's nickname from the authentication server as part of the process for authenticating the registration request.

In an alternative approach, the mobile node includes the nickname in its Mobile IP registration request. Thus, the home agent may receive the mobile node's nickname from the registration request instead of obtaining it from an authentication server. In this approach, the user may be able to select the nickname at the time the mobile node logs on for packet data services, rather than providing the nickname to the wireless service provider in advance.

By allowing a user to select and use a friendly nickname that is different than a username assigned by a wireless service provider, the user experience may beneficially be enhanced. In addition, a wireless service provider may beneficially support additional forms of communication by allowing external applications to reach a mobile node by identifying a nickname associated with the mobile node.

2. Exemplary Network Architecture

FIG. 1 illustrates a wireless telecommunications network 10 in which exemplary embodiments may be employed. In network 10, a mobile node 12 is able to access a packet-switched network for packet data services. The packet-switched network through which mobile node 12 receives packet data services could be, for example, a core network 13 that is operated by the wireless service provider to which mobile node 12 subscribes. However, mobile node 12 may also be able to access one or more external packet-switched networks, such as the Internet, through core network 13. Such external packet-switched networks are exemplified in FIG. 1 by external network 14. The wireless service provider may use one or more firewalls to enforce policies regarding what kinds of data traffic are allowed to enter core network 13. In this regard, FIG. 1 shows a firewall 15 between core network 13 and external network 14.

The packet data services that are supported in network 10 may involve mobile node 12 sending or receiving voice, data, video, or other media. For example, mobile node 12 may access core network 13 and/or external network 14 in order to engage in voice-over-IP (VoIP) communication, send or receive e-mail messages, instant messages, or multimedia messages, send or receive streaming audio or video, or engage in Web browsing.

In an exemplary embodiment, mobile node 12 is a wireless communication device, such as a wireless telephone, wireless personal digital assistant (PDA), wirelessly-equipped portable computer, networked camera, gateway, router, personal media device, or server. Thus, mobile node 12 may access core network 13 via a radio access network (RAN) 16. RAN 16 may include one or more wireless access points, base transceiver stations (BTSs), or base stations, exemplified in FIG. 1 by BTS 18. These may, in turn, may be controlled by one or more base station controllers (BSCs), such as BSC 20. To support packet communication, RAN 16 may include a packet control function (PCF), which could be either a separate network element or integrated into a BSC, as shown in FIG. 1. BSC/PCF 20 may communicate with core network 13 through a packet data serving node (PDSN) 22.

It is to be understood that the configuration of RAN 16 that is illustrated in FIG. 1 is exemplary only, as RAN 16 could include additional or alternative network elements. For example, if RAN 16 is part of a WiMAX network, RAN 16 may include an access service network gateway (ASN-GW) instead of a PDSN. If RAN 16 is part of a Long Term Evolution (LTE) network, RAN 16 may include a serving gateway (SGW) and a packet data network gateway (PDN GW) instead of a PDSN. Moreover, core network 13 could be connected to any number of RANs. Thus, in addition to RAN 16, FIG. 1 shows a RAN 24 that includes a PDSN 26, a BSC/PCF 28, and a BTS 30.

BTS 18 and BTS 30 may each have a respective wireless coverage area within which the BTS may engage in wireless communication with mobile nodes, such as mobile node 12. The wireless coverage areas of BTS 18 and BTS 30 could be either overlapping or non-overlapping. For purposes of illustration, FIG. 1 shows mobile node 12 in the wireless coverage area of BTS 18 and in wireless communication with BTS 18 via an air interface 32. The communications over air interface 32 may be in accordance with 1xRTT CDMA, EVDO, GSM/GPRS, WiFi (IEEE 802.11), WiMAX (IEEE 802.16), LTE, or other wireless communication protocol.

Although FIG. 1 shows mobile node 12 in wireless communication with BTS 18 in RAN 16, mobile node 12 may move to a different location and engage in wireless communication with a different wireless access point, such as BTS 30 in RAN 24. When communicating with BTS 30, mobile node 12 may use either the same wireless communication protocol as used with BTS 18 or a different wireless communication protocol. In some cases, it may be possible for mobile node 12 to engage in wireless communication with both BTS 18 and BTS 30 at the same time.

To support Mobile IP services, PDSNs 22 and 26 may communicate with a home agent 40 via core network 13. In the Mobile IP approach (using either IPv4 or IPv6 addresses), a mobile node may be associated with a care-of address that routes to a foreign agent (e.g., PDSN 22 or PDSN 26) and a home address that routes to a home agent (e.g., home agent 40). The care-of address may change as the mobile node changes its point of connectivity with core network 13, but the mobile node's home address may stay the same throughout. Thus, when mobile node 12 is being served by RAN 16, mobile node 12 may have a care-of address associated with PDSN 22. When mobile node 12 moves to an area that is served by RAN 24, mobile node 12 may take on a different care-of address, i.e., a care-of associated with PDSN 26, while keeping the same home address.

For each mobile node that it serves, home agent 40 may maintain a mobility binding that associates the mobile node's home address with its care-of address. In this way, a packet addressed to a mobile node's home address can reach the mobile node even when the mobile node changes its network connectivity. For example, a packet addressed to the home address of mobile node 12 may be routed to home agent 40, and home agent 40 may refer to its mobility binding for mobile node 12 to find the care-of address associated with the home address. Home agent 40 may then send the packet to that care-of address. Thus, if mobile node 12 is being served by RAN 16, home agent 40 would send the packet to a care-of address associated with PDSN 22, and if mobile node 12 is being served by RAN 24, home agent 40 would send the packet to a care-of address associated with PDSN 26.

In order to keep home agent 40 informed of its current care-of address, mobile node 12 may transmit a Mobile IP Registration Request (MIP RRQ) whenever mobile node 12 receives a new care-of address. Thus, when mobile node 12 begins operating in an area served by RAN 16, mobile node 12 may receive a care-of address associated with PDSN 22. Mobile node 12 may then report its new care-of address by transmitting a MIP RRQ, which PDSN 22 forwards to home agent 40. PDSN 22 and/or home agent 40 may authenticate the MIP RRQ by communicating with an authentication server, such as AAA server 42, via core network 13. For example, PDSN 22 and/or home agent 40 may communicate with AAA server 42 using the RADIUS protocol. A version of the RADIUS protocol is described in C. Rigney et al., "Remote Authentication Dial In User Service (RADIUS)," Request for Comments 2865, June 2000, which is incorporated herein by reference.

To support authentication by AAA server 42, the MIP RRQ transmitted by mobile node 12 may include credentials, such as a Network Access Identifier (NAI), an encrypted password, and/or other authenticators. AAA server 42 may store a user profile for mobile node 12 that includes or allows AAA server 42 to obtain the credentials that mobile node 12 would be expected to provide. In this way, AAA server 42 may compare the credentials in the MIP RRQ with the credentials in the user profile for mobile node 12 in order to validate the MIP RRQ.

As described in more detail below, when home agent 40 creates a new mobility binding for a mobile node, such as mobile node 12, home agent 40 may also establish a registration for the mobile node in a name server, such as DNS server 44. For example, home agent 40 may create a resource record for mobile node 12 in DNS server 44 that associates the home address of mobile node 12 with a nickname selected by the user of mobile node 12. Thereafter, home agent 40 may change or update the resource record, for example, to indicate that mobile node 12 is off-line. Home agent 40 may communicate with DNS server 44 to create, change, update, modify, or remove resource records for mobile nodes, for example, using the DNS Update protocol. A version of the DNS Update protocol is described in P. Vixie, "Dynamic Updates in the Domain Name System (DNS UPDATE)," Request for Comments 2136, April 1997, which is incorporated herein by reference.

Once home agent 40 has created a resource record in DNS server 44 for a mobile node, such as mobile node 12, other applications may query DNS server 44 to obtain some or all of the information contained in the mobile node's resource record. For example, an application may send DNS server 44 a query that includes a nickname. DNS server 44 may send a response that indicates that the mobile node associated with that nickname is on-line and/or includes the mobile node's home address. The application may then be able to reach the mobile node by sending a message to its home address. Applications that may query DNS server 44 in this way may include, for example, e-mail applications, instant messaging applications, Short Message Service (SMS) applications, Multimedia Messaging Service (MMS) applications, streaming media applications, and/or VoIP applications. Such applications are exemplified in FIG. 1 by application(s) 46.

In an exemplary embodiment, application(s) 46 are able to access DNS server 44 via external network 14 without going through firewall 15, as shown in FIG. 1. In particular, firewall 15 may apply a policy that blocks most external packets, such as packets from external network 14, from entering core network 13. However, after registering a mobile node's nickname and home address in DNS server 44, home agent 40 may instruct firewall 15 to allow external packets that are addressed to the mobile node's home address. Thus, it may be beneficial for an external application to be able to query DNS server 44 without going through firewall 15 in order to find the registered home address of a mobile node that will enable packets from the external application to reach the mobile node through firewall 15. Alternatively, DNS server 44 could be connected to core network 13 and firewall 15 could be configured to allow external packets that are addressed to DNS server 44. That way, application(s) 46 may be able to query DNS server 44 through firewall 15.

Network 10 may also include a messaging server 48. Messaging server 48 may be configured to receive and store messages for a mobile node that is off-line for later delivery to the mobile node, such as when the mobile node logs on for packet data services. Such messages may include, for example, voicemail messages, e-mail messages, instant messages, text messages, or multimedia messages. Messaging server 48 could also be configured to receive reply-back messages that require the mobile node to respond to the originator when the mobile node comes back on-line. For example, when a mobile node comes back on-line, messaging server 48 may deliver to the mobile node any reply-back messages that messaging server 48 received when the mobile node was off-line. The mobile node may then respond to the reply-back messages automatically. The manner or type of response may be defined in the reply-back message itself. Such reply-back messages could be, for example, Session Initiation Protocol (SIP) messages or Simple Network Management Protocol (SNMP) messages.

Instead of or in addition to receiving messages, messaging server 48 may be configured to provide an indication that a mobile node is off-line. In one example, when a mobile node is off-line, messaging server 48 may, in connection with a voicemail function, play a greeting that indicates that the mobile node is unavailable. In another example, when messaging server 48 receives an instant message for a mobile node that is off-line, messaging server 48 may respond with an instant message that indicates that the mobile node is off-line. In general, messaging server 48 may provide an off-line message for a mobile node that includes graphics, text, audio, and/or video.

The off-line message could be personalized by the mobile node's user. For example, the off-line message could be a customized Web page that includes a statement such as "I'm not here right now." The Web page could also include other content, such as blog entries, and may include links to other Websites or servers. In addition, the Web page could include one or more input forms that allow others to upload messages, files, or other content. In an exemplary embodiment, messaging server 48 is connected to core network 13, as shown in FIG. 1. Alternatively, messaging server 48 might be accessible via external network 14 without going through firewall 15

As described in more detail below, when a mobile node goes off-line, home agent 40 may change the mobile node's on-line registration in DNS server 44 (i.e., a registration that associates the mobile node's nickname with its home address) to an off-line registration. The off-line registration may associate the mobile node's nickname with an address of messaging server 48. That way, application(s) 46 may send a query containing a nickname to DNS server 44 and receive a response that indicates that the mobile node associated with the nickname is off-line. The response may also include the address of messaging server 48. The application(s) 46 may then leave a message for later delivery to the mobile node by communicating with messaging server 48 at the indicated address.

3. Exemplary Operation

Figure 2:
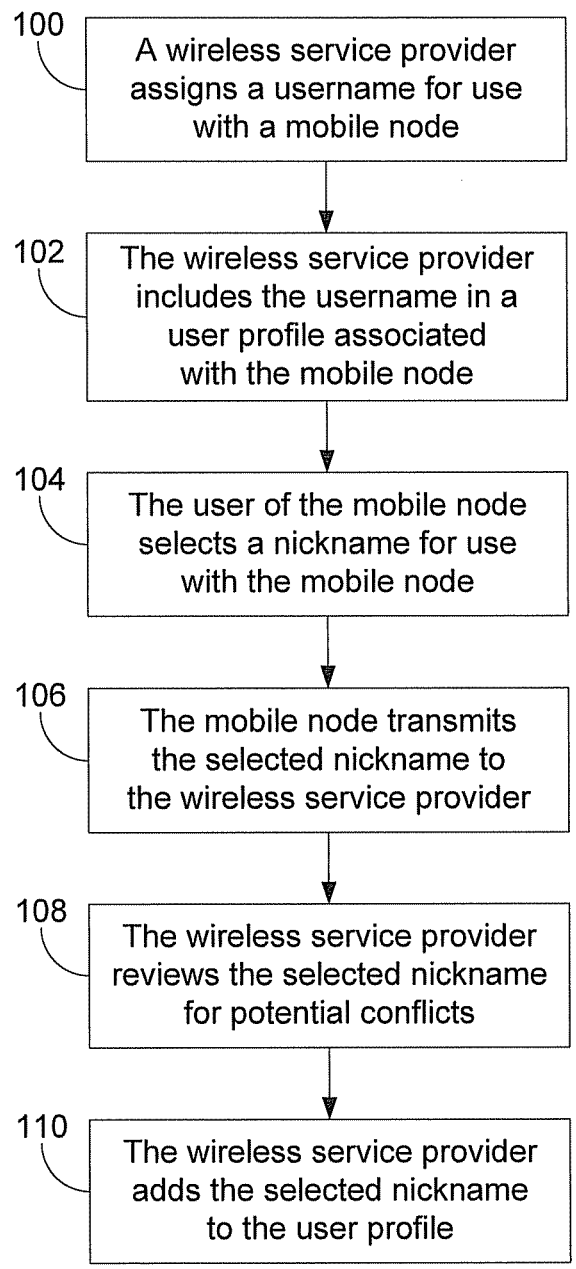
FIG. 2 is a flow chart illustrating a method for selecting a nickname for use with a mobile node and providing the selected nickname to a wireless service provider, in accordance with an exemplary embodiment.

In an exemplary embodiment, a wireless service provider may assign a username to a mobile node (e.g., as part of an NAI) but may allow the user of the mobile node to select a nickname. FIG. 2 illustrates an exemplary method for selecting a nickname and providing the selected nickname to a wireless service provider.

The method may begin when a wireless service provider assigns a username for use with a mobile node, as indicated by block 100. For example, the wireless service provider might assign the username in connection with activating service on the mobile node for a new subscriber. The username could be a combination of letters and numbers that the wireless service provider selects based, at least in part, on the subscriber's name.

The wireless service provider may include the username in a user profile associated with the mobile node, as indicated by block 102. The wireless service provider may store the user profile in, for example, an authentication server, such as AAA server 42. The username may be included in the user profile as part of an NAI having the form of "username@realm." The "realm" may correspond to a domain name associated with the wireless service provider.

At some point, the user of the mobile node may select a nickname for use with the mobile node, as indicated by block 104. The user could be, for example, the subscriber selecting the nickname at the time of service activation. Alternatively, the user may select the nickname at a later time. As one example, the mobile node may include an application that allows the user to select a nickname. As another example, the user may be able to interact with a website associated with the wireless service provider to select a nickname. In addition to or instead of these examples, the wireless service provider may make available other means for allowing the user to select a nickname for use with the mobile node.

In the case that the user selects a nickname using an application on the mobile node, the mobile node may transmit the selected nickname to the wireless service provider, as indicated by block 106. The wireless service provider may then review the selected nickname for potential conflicts, as indicated by block 108. For example, the wireless service provider may check whether the selected nickname is the same or similar to a nickname that has been selected by another user and/or whether the selected nickname is otherwise inappropriate.

If approved, the wireless service provider may add the selected nickname to the user profile, as indicated by block 110. As a result, the user profile for the mobile node would include both a username assigned by the wireless service provider and a nickname selected by the user. The username may be included in the user profile as part of an NAI having the form of "username@realm." Similarly, the nickname may be included in the user profile as part of an address having the form of "nickname@realm."

Although FIG. 2 illustrates a method in which a nickname is selected in advance and stored in the mobile node's user profile, it is to be understood that a user may be able to select a nickname in other ways. For example, a user of a mobile node might be able to select a nickname on an ad hoc basis, e.g., at the time the mobile node logs on for packet data services, so that the nickname is not stored in the mobile node's user profile. In addition, once a user has selected a nickname, the user may be able to change it at a later time, for example, by selecting a new nickname.

Figure 3:
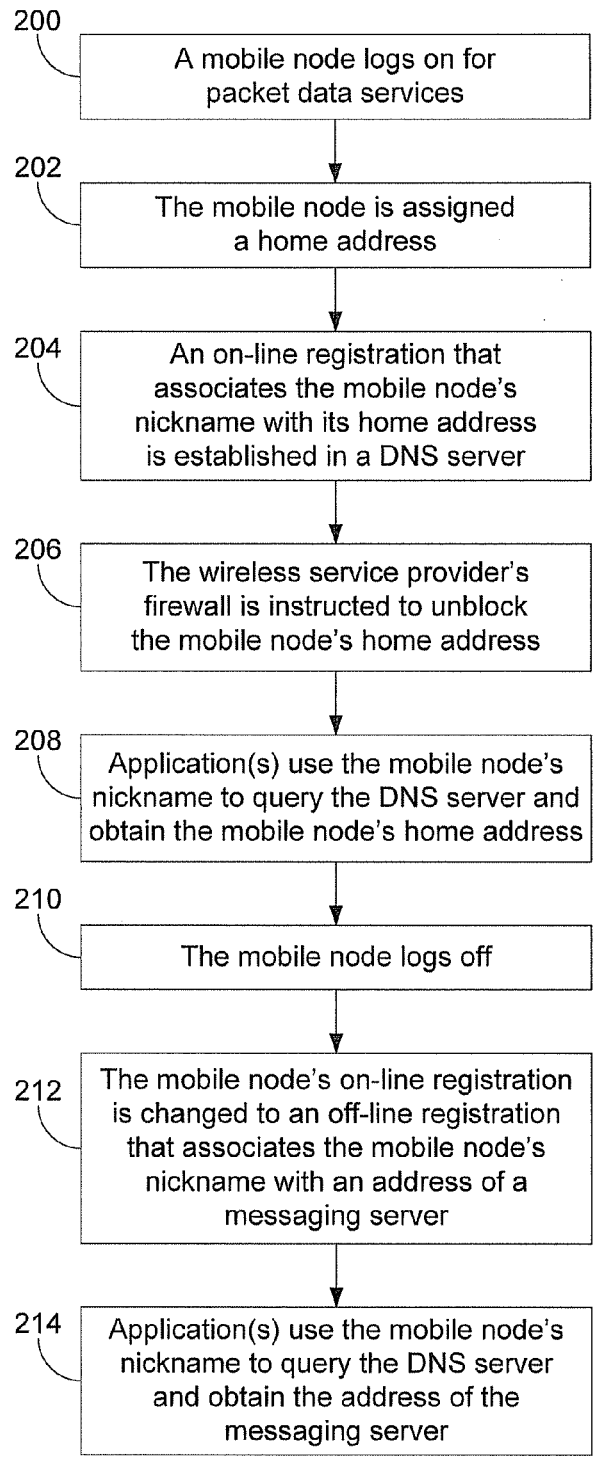
FIG. 3 is a flow chart illustrating a method for registering a nickname, in accordance with an exemplary embodiment.

FIG. 3 illustrates an exemplary method for registering a nickname that a user has selected for a mobile node. The method is described with reference to FIG. 1. It is to be understood, however, that other network architectures could be used.

The method may begin when a mobile node (e.g., mobile node 12) logs on for packet data services, as indicated by block 200. To log on for packet data services, the mobile node may, for example, transmit a Mobile IP Registration Request (MIP RRQ). The mobile node is associated with a username assigned by its wireless service provider and a nickname that has been selected by its user. The nickname is different than the username. The nickname may have been selected by the user in advance, for example, through a process as described above for FIG. 2. Thus, the nickname may be in a user profile that may be stored on an authentication server (e.g., AAA server 42). Alternatively, the user may select the nickname at the time that the mobile node logs on for packet data services. In that case, the nickname may be included in the MIP RRQ transmitted by the mobile node rather than stored in the mobile node's user profile.

If the mobile node's MIP RRQ is authenticated, then the mobile node may be assigned a home address, as indicated by block 202. In an exemplary embodiment, the mobile node is dynamically assigned the home address by a home agent (e.g., home agent 40). The dynamically assigned home address may stay with the mobile node as it changes its network connectivity (e.g., when mobile node 12 moves from RAN 16 to RAN 24) until the mobile node logs off, powers down, or times out through inactivity. Alternatively, the mobile node may have a home address that is dynamically assigned in other ways, or the mobile node may have a permanent home address.

In addition to assigning a home address to the mobile node, the home agent may create a mobility binding for the mobile node. The mobility binding associates the mobile node's home address with its care-of address (which may be included in the mobile node's MIP RRQ). For example, mobile node 12 operating in an area served by RAN 16 may transmit a MIP RRQ that includes a care-of address associated with PDSN 22. If the mobile node changes its network connectivity, the home agent may receive a subsequent MIP RRQ that includes a new care-of address. For example, if mobile node 12 moves to an area served by RAN 24, it may transmit a MIP RRQ that includes a care-of address associated with PDSN 26. In response, the home agent may update its mobility binding to include the new care-of address.

Once the mobile node is assigned a home address, an on-line registration that associates the mobile node's nickname with its home address may be established in a DNS server, as indicated by block 204. To establish the on-line registration, the home agent that assigned the home address (e.g., home agent 40) may send a DNS Update message with the nickname and home address to the DNS server (e.g., DNS server 44).

As noted above, the home agent may update its mobility binding for a mobile node when it receives a MIP RRQ with a new care-of address for the mobile node. In an exemplary embodiment, the mobile node's on-line registration in the DNS server identifies the mobile node's home address, rather than its care-of address. Thus, when the home agent receives a new care-of address for a mobile node, the home agent would typically update its mobility binding for the mobile node without updating the mobile node's on-line registration.

The wireless service provider's firewall (e.g., firewall 15) could also be instructed to unblock the mobile node's home address, as indicated by block 206. For example, the home agent may identify the mobile node's home address to the firewall and may instruct the firewall to apply a policy that unblocks at least some external packets that are addressed to the mobile node's home address. In this way, application(s) 46 that send packets from external network 14 may be able to reach mobile node 12 through firewall 15. It is to be understood, however, that firewall 15 might still block some external packets that are addressed to the mobile node's home address, for example, because the packets have potentially malicious content or originate from suspect locations.

Once the on-line registration is established, various applications may use the mobile node's nickname to query the DNS server and obtain the mobile node's home address, as indicated by block 208. For example, another user who is aware of the mobile node's nickname may identify the nickname as the desired recipient of an instant message, multimedia message, or other form of communication. An instant messaging application, multimedia messaging application, or other application, for example, as exemplified in FIG. 1 by application(s) 46, may determine how to reach the nickname by querying the DNS server and obtaining the home address. The application may then send a message to that home address, so that the message may be routed to the mobile node through its home agent.

At some point, the mobile node logs off, as indicated by block 210. The mobile node might log off in connection with powering down. Alternatively, the mobile node might simply log off from packet data services and remain powered up for voice services. The home agent that assigned the home address to the mobile node may be notified that the mobile node has logged off and, in response, may clear its mobility binding for the mobile node.

As indicated by block 212, the home agent may also change the mobile node's on-line registration to an off-line registration that associates the mobile node's nickname with an address of a messaging server. The messaging server (e.g., messaging server 48) may be configured to receive messages for the mobile node and/or provide messages indicating that the mobile node is off-line.

At that point, various applications may use the mobile node's nickname to query the DNS server and obtain the address of the messaging server, as indicated by block 214. An application may then send a message to the indicated address (e.g., a voicemail message, e-mail message, instant message, or multimedia message), and the messaging server may store the message for later delivery to the mobile node. Alternatively or additionally, when an application contacts the messaging server, the messaging server may respond with a personalized greeting or other indication that the mobile node is off-line.

Although FIG. 3 illustrates the case that the mobile node's registration is changed from an on-line registration to an off-line registration when the mobile node logs off, it is to be understood that other options could be implemented. For example, the mobile node's registration could simply be removed when the mobile node logs off.

Figure 4:
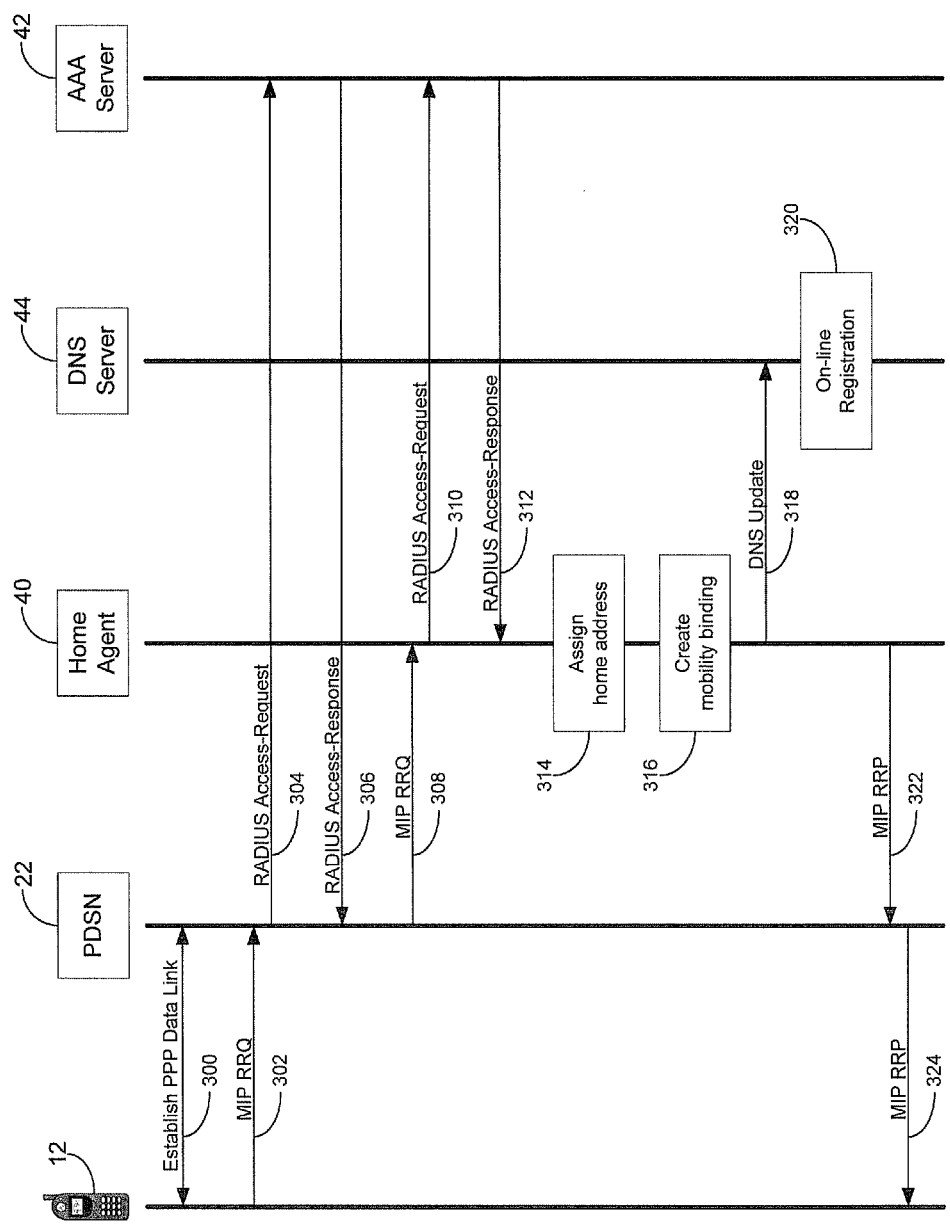
FIG. 4 is a call flow diagram illustrating a method of registering a nickname in the wireless telecommunications network of FIG. 1, in accordance with an exemplary embodiment.

FIG. 4 is a call flow diagram illustrating an exemplary method of using a nickname in wireless telecommunications network 10. In this method, the user of the mobile node (mobile node 12) is assumed to have selected the nickname and provided the selected nickname to the wireless service provider in advance, for example, in accordance with the method shown in FIG. 2.

The method shown in FIG. 4 begins when mobile node 12 logs on for packet data services through its wireless service provider, while operating in the coverage area of RAN 16. In some cases, mobile node 12 might log on for packet data services automatically, for example, whenever mobile node 12 powers up. In other cases, mobile node 12 might log on for packet data services at the instance of the user, for example, when the user invokes an application that uses packet data services (such as an e-mail application or Web browsing application).

To log on for packet data services, mobile node 12 and PDSN 22 may exchange signaling 300 to set up a data link between them, for example, using the Point-to-Point Protocol (PPP). Mobile node 12 may then transmit a Mobile IP Registration Request (MIP RRQ) 302. MIP RRQ 302 may include the username associated with mobile node 12 in the form of an NAI and a care-of address associated with PDSN 22. Mobile node 12 may receive the care-of address as part of data link signaling 300, from a foreign agent advertisement broadcast by PDSN 22, or in some other manner.

MIP RRQ 302 may also include an encrypted password and/or other information that may be used for authentication purposes. To authenticate the request, PDSN 22 may transmit a RADIUS Access-Request 304 to AAA server 42. Access-Request 304 may include the NAI and authentication information from MIP RRQ 302. The AAA server 42 may use the NAI to find the user profile associated with mobile node 12 and compare the authentication information in Access-Request 304 with the authentication information it obtains from the user profile. If the authentication information matches, then AAA server 42 sends a RADIUS Access-Response 306 that accepts the request.

Having received authorization from AAA server 42, PDSN 22 sends a MIP RRQ 308 to home agent 40. MIP RRQ 308 may include similar information as contained in MIP RRQ 302, including the care-of address, NAI, and authentication information of mobile node 12. To authenticate the request, home agent 40 may transmit a RADIUS Access-Request 310 to AAA server 42. Access-Request 310 may include the NAI and authentication information from mobile node 12. If AAA server 42 is able to authorize the request, then it responds with a RADIUS Access-Response 312 that accepts the request. In this example, it is assumed that the nickname for mobile node 12 is included in the user profile stored on AAA server 42. Accordingly, AAA server 42 may retrieve the user-selected nickname from the user profile for mobile node 12 and include the nickname in RADIUS Access-Response 312.

Having received authorization from AAA server 42, home agent 40 may complete the Mobile IP registration requested by mobile node 12. To do so, home agent 40 may dynamically assign a home address to mobile node 12, as indicated by block 314. Home agent 40 may then create a mobility binding for mobile node 12, as indicated by block 316. The mobility binding associates the home address assigned to mobile node 12 with the care-of address of mobile node 12 that home agent 40 obtained from MIP RRQ 308.

In this case, home agent 40 received a nickname associated with mobile node 12 in RADIUS Access-Response 312 from AAA server 42. As a result, home agent 40 may also establish an on-line registration for mobile node 12 by transmitting a DNS Update 318 to DNS server 44. The DNS Update 318 may request the establishment of a resource record that associates the nickname with the home address of mobile node 12. In response, DNS server 44 may establish the requested on-line registration for mobile node 12, as indicated by block 320.

To establish the on-line registration, DNS server 44 may create a new resource record for mobile node 12, for example, if DNS server 44 does not already have a resource record for that nickname. In other cases, however, DNS server 44 might already have a resource record for that nickname, such as an off-line registration for mobile node 12 that associates the nickname with an address of a messaging server. In that case, the DNS server 44 may establish the on-line registration by updating the existing resource record so that the nickname is associated with the home address assigned to mobile node 12 instead of the address of the messaging server.

The nickname in the resource record could be in the form of a domain name. For example, if the NAI of mobile node 12 is in the form of "username@realm," where the "realm" is a domain name, the domain name in the resource record established for mobile node 12 could be in the form of "nickname.realm" or in some other form that includes both the nickname and the realm.

When the on-line registration for mobile node 12 has been successfully established, home agent 40 may send a Mobile IP Registration Response (MIP RRP) 322 to PDSN 22. MIP RRP 322 may include the home address assigned to mobile node 12 and may also include an indication that an on-line registration has been created for the nickname. PDSN 22 may then send a corresponding MIP RRP 324 to mobile node 12.

Although the call flow shown in FIG. 4 assumes that home agent 40 obtains the nickname from AAA server 42, it is to be understood that home agent 40 might obtain the nickname in other ways. For example, mobile node 12 might include the nickname in MIP RRQ 302, or PDSN 22 might obtain the nickname from AAA server 42 and include the nickname in MIP RRQ 308.

4. Conclusion

Exemplary embodiments of the present invention have been described above. Those skilled in the art will understand, however, that changes and modifications may be made to these embodiments without departing from the true scope and spirit of the invention, which is defined by the claims.

What is claimed is:

1. A method, comprising:
   a home agent receiving a registration request for a mobile node, wherein said mobile node is associated with a username and a nickname that is different than said username;
   after receiving said registration request, said home agent assigning a home address to said mobile node; and
   said home agent registering in a name server an association between said nickname and said home address.

2. The method of claim 1, wherein said registration request is a Mobile IP registration request that includes a care-of address for said mobile node.

3. The method of claim 2, further comprising:
   said home agent creating a mobility binding for said mobile node, wherein said mobility binding associates said home address with said care-of address.

4. The method of claim 1, further comprising:
   said home agent instructing a firewall to allow external packets that are addressed to said home address.

5. The method of claim 1, wherein said registration request includes said username.

6. The method of claim 5, wherein said registration request further includes said nickname.

7. The method of claim 5, further comprising:
   said home agent sending a request to an authentication server, said request including said username; and
   said home agent receiving a response from said authentication server, said response including said nickname.

8. The method of claim 1, wherein said name server is a domain name system (DNS) server.

9. The method of claim 1, wherein said nickname has been selected by a user of said mobile node and said username has been selected by a wireless service provider.

10. The method of claim 9, further comprising:
    said mobile node receiving a selection of said nickname from said user.

11. The method of claim 10, further comprising:
    said wireless service provider adding said nickname to a user profile associated with said mobile node.

12. A method, comprising:
    a home agent receiving an initial Mobile IP registration request for a mobile node, said initial Mobile IP registration request including a care-of address for said mobile node;
    said home agent receiving a nickname that has been selected by a user of said mobile node;
    after receiving said initial Mobile IP registration request, said home agent assigning a home address to said mobile node;
    said home agent creating a mobility binding that associates said home address with said care-of address; and
    said home agent establishing an on-line registration for said mobile node in a domain name system (DNS) server, wherein said on-line registration associates said nickname with said home address.

13. The method of claim 12, further comprising:
    said home agent receiving a subsequent Mobile IP registration request for said mobile node, said subsequent Mobile IP registration request including a new care-of address for said mobile node; and
    said home agent updating said mobility binding with said new care-of address without updating said on-line registration.

14. The method of claim 12, further comprising:
    said home agent receiving a notification that said mobile node is off-line;
    in response to said notification, said home agent changing said on-line registration to an off-line registration, wherein said off-line registration associates said nickname with an address of a messaging server.

15. The method of claim 12, wherein said home agent receiving a nickname that has been selected by a user of said mobile node comprises:
    said home agent receiving a network access identifier (NAI) of said mobile node, said NAI including a username;
    said home agent sending a query to an authentication server, said query including said NAI; and
    said home agent receiving a response from said authentication server, said response including said nickname.

16. The method of claim 15, wherein said nickname is different than said username.

17. The method of claim 15, wherein said initial Mobile IP registration request includes said NAI.

18. A system, comprising:
    a domain name system (DNS) server;
    an authentication server, wherein said authentication server stores user profile information regarding a mobile node, said user profile information including a username selected by a wireless service provider and a nickname selected by a user of said mobile node, wherein said nickname is different than said username; and a home agent, wherein said home agent is configured to receive a registration request that includes said username, assign a home address to said mobile node after receiving said registration request, and establish an on-line registration for said mobile node in said DNS server, wherein said on-line registration associates said nickname with said home address.

19. The system of claim 18, further comprising:
a messaging server, wherein said messaging server is configured to provide an off-line message when said mobile node is off-line.

20. The system of claim 19, wherein said home agent is further configured to change said on-line registration to an off-line registration in response to a notification that said mobile node is off-line, wherein said off-line registration associates said nickname with an address of said messaging server.

* * * * *